United States Patent [19]

Betz

[11] 4,008,050
[45] * Feb. 15, 1977

[54] APPARATUS FOR COMBINING OXYGEN AND HYDROGEN

[76] Inventor: Erwin C. Betz, 524 Mill Valley Road, Palatine, Ill. 60067

[ * ] Notice: The portion of the term of this patent subsequent to June 18, 1991, has been disclaimed.

[22] Filed: June 11, 1975

[21] Appl. No.: 585,741

[52] U.S. Cl. .......................... 23/288 R; 23/277 C;
23/288 K; 423/580; 423/659; 176/37
[51] Int. Cl.² ........................ B01J 8/04; G21F 9/02;
C01B 5/00
[58] Field of Search .................. 23/288 R, 277 C;
423/580

[56] References Cited

UNITED STATES PATENTS

| 3,262,758 | 7/1966 | James et al. ................. 23/288 R |
| 3,421,859 | 1/1969 | Kruggel ...................... 23/288 R X |
| 3,627,497 | 12/1971 | Klein et al. ................. 23/288 R |
| 3,755,075 | 8/1973 | Henrie ......................... 423/580 X |
| 3,817,716 | 6/1974 | Betz ........................... 23/288 R X |
| 3,857,927 | 12/1974 | Henrie ........................ 23/288 R X |

Primary Examiner—James H. Tayman, Jr.
Attorney, Agent, or Firm—Hume, Clement, Brinks, Willian, Olds & Cook, Ltd.

[57] ABSTRACT

An apparatus for catalytically combining hydrogen and oxygen which includes two concentric catalyst chambers arranged so that the outer chamber surrounds the inner chamber and the gas stream passes radially through the outer catalyst chamber.

10 Claims, 2 Drawing Figures

APPARATUS FOR COMBINING OXYGEN AND HYDROGEN

BACKGROUND OF THE INVENTION

The present invention relates to an improved apparatus for recombining the molecular oxygen and the molecular hydrogen which are contained in the radioactive waste gas stream found in conventional nuclear power plants.

In the operation of conventional nuclear power reactors, non-radioactive molecular hydrogen and molecular oxygen are produced from steam on the extremely hot surfaces of the fuel elements in the reactor by radiolysis. The operation of conventional nuclear power plants also generates radioactive gases which find their way into the plant steam system and are carried over into the turbines, preheaters and condensers. Among the radioactive gases which find their way into the steam system are nitrogen, oxygen, krypton, xenon, and halogens such as fluorine and iodine. These radioactive gases cannot be released in their original form or concentration and must be passed through various waste treating systems to reduce the levels of the radioactive gases to below acceptable limits.

The mixed gaseous radioactive waste products and the non-radioactive molecular hydrogen and molecular oxygen are removed from the steam turbine condenser along with air that has leaked into the condenser system by a multi-stage steam jet air ejector system which is applied to the condenser. This mixed off-gas stream is then treated to reduce the radioactive gases to the levels permitted by regulation and to recombine the hydrogen and oxygen to water. First, the molecular oxygen and molecular hydrogen are recombined to water in a catalytic recombiner and the water produced therefrom is removed in a condenser. Then, the remaining gases are detained on their path to the exhaust stack in order to allow for decay of radioactivity. Entrained aerosols and solids are generally removed by mechanical separation and filtration.

SUMMARY OF THE INVENTION

The present invention relates to an improved apparatus for the recombination of the oxygen and hydrogen which are contained in the mixed waste gas stream found in a nuclear power plant. The apparatus of the present invention includes an initial catalyst chamber containing a catalyst capable of combining the molecular oxygen and the molecular hydrogen and a final catalyst chamber also containing such a catalyst. The final catalyst chamber surrounds the initial catalyst chamber in a spaced apart relationship, and is so constructed and arranged that the waste gases pass radially through it. In the initial or primary catalyst chamber, part of the available hydrogen and oxygen are combined to form water at a relatively high space velocity and at a relatively low temperature. In the final or secondary catalyst chamber, further combination of oxygen and hydrogen takes place at a relatively low space velocity and at a relatively higher temperature. Also included in the apparatus are means for delivering the mixed waste stream to the initial catalyst chamber, a means for removing the gases after they have passed radially through the final catalyst chamber and a means for transferring the gas from the initial catalyst chamber to the final catalyst chamber.

In a preferred aspect of the present invention, a separate preliminary chamber is provided to remove catalyst poisons from the waste gas feed stream before they have a chance to adversely affect the catalyst used in the recombination reaction. Another preferred aspect of the present invention involves the incorporation into the recombiner apparatus of a condenser to remove the water formed by the combination reaction.

One advantage of the present invention is that the initiation of the recombination reaction can be induced to take place at a lower energy level in the feed waste gas then would normally be possible. This is accomplished by locating the final catalyst chamber so that it surrounds the initial catalyst chamber. This spacial arrangement projects the heat generated in the final catalyst chamber inwardly toward the initial catalyst chamber and increases the temperature available in that chamber, thus saving preheat energy and permitting a higher rate of reaction.

Another advantage of the apparatus of the present invention is that the heat generated by the reaction in the initial catalyst chamber lowers the amount of catalyst required in the secondary or final catalyst chamber to achieve the desired degree of hydrogen removal.

Furthermore, the concentric arrangement of the initial and final catalyst chambers operates to reduce pressure boundaries on exterior walls of the recombiner vessel.

Additional features and advantages of this invention are described in, and will appear from, the description of the preferred embodiments which follow and from the drawings to which reference is now made.

DESCRIPTION OF PREFERRED EMBODIMENTS OF THE INVENTION

The waste gas stream fed to the recombiner apparatus of the present invention contains air, water, molecular hydrogen, molecular oxygen, and radioactive gases such as nitrogen, oxygen, krypton, xenon, and halogens.

The catalysts which may be used for the recombination of hydrogen and oxygen to water are generally well known in the art. These catalysts may have either a metallic base or a ceramic base. A particularly suitable metal based catalyst useful in the apparatus and method of the present invention is that disclosed in U.S. Pat. No. 3,712,856, the disclosure of which is hereby incorporated by reference.

Figure 1:
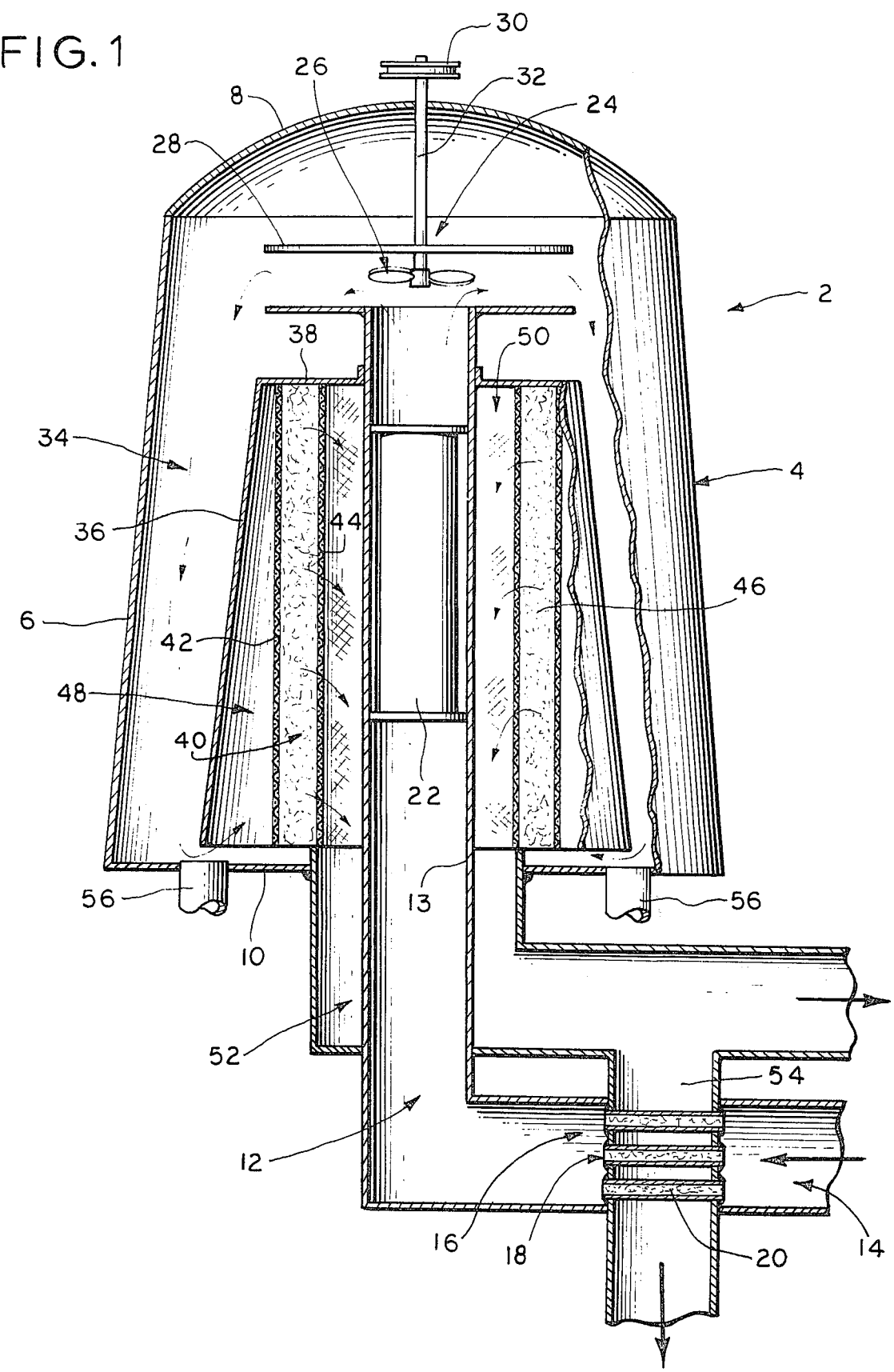
FIG. 1 is a cutaway plan view of an apparatus embodying the features of the present invention.

Now, referring to FIG. 1, an off-gas recombiner apparatus embodying the features of the present invention is indicated by reference numeral 2. In the preferred embodiment shown, recombiner 2 has an outer housing 4, of heavy gauge metal or the like. The outer housing 4 has side wall 6 of generally circular cross-section and tapers outwardly so that housing 4 is wider at the bottom of the apparatus that is near the top. In the embodiment shown, housing 4 also has a domed roof section 8 and a generally flat bottom plate 10 which has an opening in the center to receive the vertical, generally cylindrical central passageway 12 (formed by wall 13) and outlet pipe 52.

The waste gas stream containing the radioactive gases, the molecular oxygen and hydrogen, air and water vapor enters the recombiner apparatus 2 through the inlet port 14 which is connected to the central passageway 12. This waste gas stream comes from the output of the stream jet air ejector system associated with the turbine condenser section of the nuclear power plant.

Once in the off-gas recombiner system, the waste gas stream first, preferably, passes through a scavenger system 16 which contains a scavenger substance for removing compounds which poison the preferred recombiner catalysts used in the main catalyst beds. One group of poisons for the preferred recombination catalysts described above are halogens. Since iodine impurities are present in radioactive waste gases, especially during loss of coolant accident conditions, the protection of the recombiner catalysts against iodine interference is of utmost importance. Methyliodine in particular is present in abundance. Since it has a boiling point of 42.5° C, the gas temperature should be kept above this temperature to keep the methyliodine in the vapor phase.

One way to remove the iodine poisons from the gas stream is to thermally decompose them and allow the decomposition products to react chemically with the scavenger to form a compound which is stable under the conditions. Such a compound, for example, is silveriodide, which decomposes at 552° C. The methyl group remaining decomposes by surface combustion, or catalysis, to carbon dioxide and water, and passes through the recombiner system.

A particularly advantageous scavenger for the removal of the halogens consists of a finely divided layer of metallic silver on either a ceramic or metallic support, although the support disclosed in U.S. Pat. No. 3,712,856 is preferred. One method of preparing this type of catalyst involved suspending silver oxide in glycol and water and immersing the support material after it has been heated to about 100° C. The coated support material is then dried in an inert atmosphere containing a small amount of hydrogen. The drying temperatures used range up to about 560° C.

As shown in FIG. 1, scavenger system 16 preferably consists of a controlled temperature exchanger bundle 18 having the scavenger substance 20 located on the tube side of the exchanger and using the exit gases from the recombiner as the heating media on the shell side of the exchanger. Using the controlled temperature exchanger bundle to house the scavenger substance permits maintenance of the scavenger substance at a temperature which is sufficiently high to decompose methyliodide, but below the decomposition point of the stable iodine compound formed with the scavenger.

Once the gas stream has passed through the tube side of the scavenger system 16, it enters the central passageway 12 which contains the initial or primary recombiner catalyst chamber 22. In the embodiment shown, chamber 22 comprises a generally cylindrical spool-shaped receptacle for easy removal and so the catalyst itself never touches the walls of the recombiner apparatus, although such design is by no means critical. Initial catalyst chamber 22 preferably contains a plurality of metallic screens having catalytically treated surfaces, although ceramic-base catalysts may also be employed. The preferred catalyst is that described in the above-mentioned U.S. Pat. No. 3,712,856. Initial catalyst chamber 22 may include a means for electrically heating the catalyst contained in the bed so that the temperature of the bed may be raised to the proper temperature range for initiation of the recombination reaction.

A centrifugal fan unit 24 having blades 26 and a shroud assembly 28 is positioned above the upper portion of central passageway 12, to draw the gases through central passageway 12 and the initial catalyst element 22, and distribute them at a radially outward direction, as indicated by the arrows. The blades 26 are driven by a suitable drive means (not shown) connected to a pulley 30 by a belt (not shown). Pulley 30 is, in turn, connected to blades 26 by a shaft 32.

Once the gases have been distributed radially outwardly by the fan unit 24 they pass in a generally downward direction through passageway 34 between the inner side of the side wall 6 and outer side of skirt 36. Skirt 36 is attached at its upper end to the central flue 12 by plate 38. It is preferred that skirt 36 be of a generally circular cross section. In the preferred embodiment shown, skirt 36 has a frusto-conical configuration that is wider at the bottom than at the top.

In one embodiment of the invention, skirt 36 may be coated with a recombiner catalyst on its outer surface to assist in the recombination of the molecular hydrogen and oxygen. An advantage of the outwardly tapered construction of skirt 36 is that any aerosol particles that have not previously been destroyed will tend to be "rolled along" the progressively widening outer surface of the skirt 36 which tends to break down the gas layer which insulates the aerosol droplets, rendering them susceptible to vaporization and recombination.

Located inside skirt 36 and plate 38 is the final recombiner catalyst chamber 40, a generally cylindrical recombining catalyst element spaced apart from outer wall 13 of central passageway 12 by exit chamber 50. By the term "generally cylindrical," it is simply meant that the recombiner catalyst chamber 40 preferably completely surrounds outer wall 13 of central passageway 12. However, the overall catalyst chamber 40 need not be cylindrical, but may for example, by polygonal in shape, being made up of a number of flat catalyst elements. In any event, generally cylindrical catalyst chamber 40 is preferably formed by outer screen 42 and inner screen 44 between which is located the catalyst bed 46. In the embodiment shown, catalyst 46 comprises catalytically coated metal ribbon, although ceramic catalyst may also be used. This catalyst 46 comprises the final recombiner catalyst. The preferred final recombiner catalyst is that disclosed in U.S. Pat. No. 3,712,856.

Final catalyst chamber 40 is positioned so that it surrounds initial recombiner catalyst chamber 22, i.e., initial catalyst chamber 22 is located in that portion of the central passageway 12 which is surrounded by the final catalyst chamber 40. The purpose of this arrangement is to project heat from the final catalyst chamber 40 toward the initial catalyst chamber 22. This will assist the initiation of the recombination reaction in the initial catalyst chamber by increasing the energy level available in that chamber so that the reaction will take place with feed waste gases having energy levels lower that might normally be available for adequate reaction in the preliminary catalyst chamber. Furthermore, the heat generated in the initial catalyst chamber elevates the temperature of the secondary catalyst chamber, permitting a higher rate of reaction with a resultant savings in catalyst volume required to achieve the desired hydrogen removal. Overall, the two-stage arrangement of this invention permits a very high hydrogen conversion.

Once the gas stream has passed through passageway 34 it enters the lower end of passageway 48 which is located between the inside wall of skirt 36 and catalyst chamber 40. After passing radially through the final recombiner catalyst bed 46, the gases enter the exit chamber 50 which is in flow communication with the exit pipe 52. The exit pipe is arranged so that at least a part of the exiting gases can be directed via passageway 54 to the shell side of heat exchanger bundle 18 associated with scavenger system 16. Eventually, the exiting gases are passed on to the next step in the overall waste treating system.

In a further aspect of the present invention, recombiner apparatus 2 may be fitted with a gas recycle system which recycles gases which have passed through initial catalyst chamber 22, but not through final catalyst chamber 40. Part of this recycle system would be recycle passageway 56 which may be valve controlled in connection with a temperature sensor located in central passageway 12 above the initial catalyst chamber 22. This recycle system may be designed so that the recycled gases are added to the entering gas stream either before or after the entering gases pass through scavenger assembly 16. The primary purpose of the recycle system is to help balance the overall system gas flow, maintain the proper space velocities through the catalyst beds and to provide better temperature control in the system.

Figure 2:
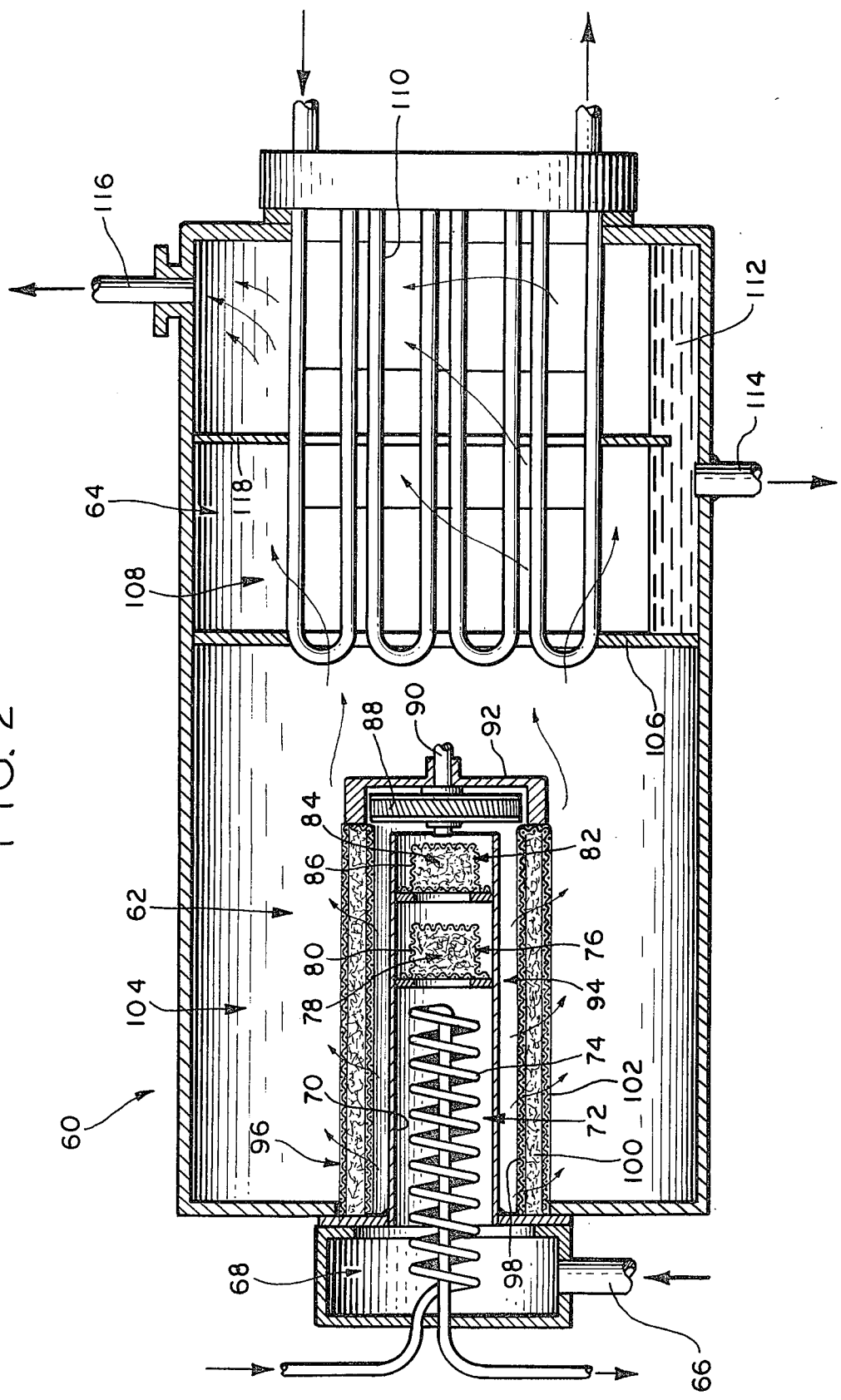
FIG. 2 is a cutaway plan view of a second apparatus embodying the features of the present invention.

FIG. 2 illustrates another preferred embodiment of the present invention. This particular embodiment of the invention, apparatus 60, includes a recombiner system 62 and also a water condenser system 64 to remove the water formed by the recombination of the molecular hydrogen and oxygen.

The waste gases first enter the generally horizontal recombiner apparatus 60 via entry pipe 66 and then pass into a preliminary passageway 68 which is connected to central passageway 72 formed by wall 70. Preliminary passageway 68 and the initial portions of central passageway 72 form a gas preheat section which includes a heating coil 74 which is preferably fed with steam. This preheat section raises the temperature of the gas stream to a temperature sufficient to permit satisfactory removal of the iodine impurities by the scavenger chamber 76 and to initiate the recombination reaction in the initial catalyst chamber 82.

Once the gases have been sufficiently preheated, they pass through scavenger chamber 76 which is located in central passageway 72. As illustrated, scavenger chamber 76 is generally cylindrical in shape and consists of a bed 78 of material capable of removing the catalyst poisons contained in the gas mixture and is enclosed by metal screening or perforated plates 80. Next, the gases pass through the initial catalyst chamber 82 in which a portion of the hydrogen and oxygen are combined to water. Like the scavenger chamber, initial catalyst chamber 82 is also generally cylindrical in shape and consists of a catalyst bed 84, enclosed by metal screening or perforated plates 86. Preferably, catalyst bed 84 contains a plurality of metallic screens having catalytically treated surfaces with the preferred catalyst being that described in U.S. Pat. No. 3,712,856.

At the end of central passageway 72 is a gas diffusor 88 which draws the gases through the central passageway, reverses the gas flow, and directs the gases into passageway 94. Gas diffusor 88 is connected to a drive means (not shown) via shaft 90 and is supported in the recombiner section of apparatus 60 by housing 92 which is supported by the outer, final catalyst chamber 96. Passageway 94, which is formed between wall 70 and outer catalyst chamber 96, directs the gas stream to final catalyst chamber 96 so that the gas stream may flow radially through final catalyst chamber 96.

Final catalyst chamber 96 is positioned so that it surrounds initial recombiner catalyst chamber 82 and, preferably, scavenger chamber 76. Chamber 96 is generally cylindrical, as defined above, and is preferably formed by inner screen 98, final catalyst bed 100 and outer screen 102. Preferably, final catalyst bed 100 comprises metal ribbon coated with the catalyst disclosed in U.S. Pat. No. 3,712,856.

After the gases have passed from passageway 94 radially through final catalyst chamber 96, they pass into outer chamber 104 which surrounds the entire recombiner section 62 of apparatus 60. At this stage the molecular hydrogen and oxygen have been essentially completely recombined into water.

From outer chamber 104, the gases pass out of the recombiner section 62 of the apparatus into the condensation section 64 in which the water vapor entrained in the gas stream is condensed. The two sections 62 and 64 of the recombiner apparatus are partially separated by a metal wall 106 which is arranged to permit passage of the gases into the central, tube section of the condenser system. The condenser section 62 comprises a shell and tube heat exchanger arrangement in which the gas passageways form the shell side 108. The tubes 110 typically contain water as the condensation medium. The condensed water 112 is collected at the bottom and is withdrawn through pipe 114. The exiting gas stream leaves the apparatus through pipe 116. The condenser section 64 may also be equipped with baffles 118 which insure proper gas flow and distribution on the shell side of the exchanger to promote the removal of the entrained water.

The recombination reaction generally occurs within a temperature range of about 130°–950° F and preferably takes place between about 350° and 950° F. The hourly space velocity in the initial catalyst chamber is preferably maintained at a high level, on the order of about 400,000. In the final catalyst chamber, relatively low space velocities are preferred, on the order of 3000 to 20,000.

The embodiments described herein are intended to be exemplary of the types of apparatus which fall within the scope of my invention. However, one skilled in the art would certainly be expected to be able to make modifications and variations of these preferred embodiments without departing from the spirit and scope of the invention as defined in the following claims.

I claim:

1. An apparatus for recombining oxygen and hydrogen comprising:
    a long, centrally disposed, tubular passageway;
    an initial catalyst chamber within the passageway contained a catalyst capable of recombining oxygen and hydrogen;
    means for delivering a gas stream containing hydrogen and oxygen to the tubular passageway;
    a generally annular final catalyst chamber containing a catalyst capable of recombining oxygen and hydrogen, the final catalyst chamber extending over a significantly greater length than the initial catalyst chamber and surrounding the tubular passageway in a spaced apart relationship therewith so that a gas flow channel is formed between the tubular passageway and final catalyst chamber;

means for removing the gas stream from the tubular passageway after the gas stream has passed through the initial catalyst chamber and for delivering the gas stream to one of the long sides of the final catalyst chamber so that the gas stream flows radially through the final catalyst chamber in a direction generally perpendicular to the direction of flow of the gas stream through the initial catalyst chamber;

and outlet means for removing the gas stream from the apparatus after it has passed radially through the final catalyst chamber.

2. The apparatus of claim 1, further comprising a preliminary chamber located in the gas stream ahead of the initial catalyst chamber containing a scavenger for the catalyst poisons contained in the gas stream.

3. The apparatus of claim 1, wherein the final catalyst chamber comprises two metal screens enclosing a catalyst bed.

4. The apparatus of claim 1, further comprising a condenser in the outlet means for removing the water produced in the initial and final catalyst chambers.

5. The apparatus of claim 2, wherein the preliminary catalyst chamber is arranged to cooperate with the outlet means so that energy is imparted to the scavenger contained in the preliminary chamber by the gas stream flowing through the outlet means.

6. The apparatus of claim 1, wherein the channel formed between the tubular passageway and the final catalyst chamber forms a portion of the means for delivering the gas stream to the final catalyst chamber so that the gas stream flows radially outward through the final catalyst chamber.

7. The apparatus of claim 1, wherein the channel formed between the tubular passageway and the final catalyst chamber forms part of the outlet means so that the gas stream flows radially inward as it passes through the final catalyst chamber.

8. The apparatus of claim 1, further comprising distribution means between the initial and final catalyst chambers to assist in the distribution and flow of the gas stream in the apparatus.

9. An apparatus for combining oxygen and hydrogen comprising:
a housing;
a means for delivering a gas stream containing oxygen and hydrogen to one end of the housing;
a long, axially disposed, tubular passageway within the housing whch extends from the end of the housing to which the gas stream is delivered, said passageway being in flow communication with the gas delivery means;
a relatively thick, packed bed, initial catalyst chamber disposed within the tubular passageway so that the gas stream flows axially through the catalyst chamber as it flows through the passageway;
a generally annular final catalyst chamber within the housing which surrounds the initial catalyst chamber and the tubular passageway and is spaced apart from the tubular passageway to form a channel between it and the tubular passageway and which has a long, relatively thin, packed bed extending over a significantly greater axial length than the initial catalyst chamber;
a means within the housing, in flow communication with the tubular passageway, for delivering the partially recombined gas stream to the channel so that the gas stream will flow radially outward through the thin packed bed of the final catalyst chamber;
and, outlet means, in flow communication with the outer side of the final catalyst chamber, for removing the gas stream from the apparatus after it has passed radially through the final catalyst chamber.

10. An apparatus for combining oxygen and hydrogen comprising:
a housing;
a means for delivering a gas stream containing oxygen and hydrogen to one end of the housing;
a long, axially disposed, tubular passageway within the housing which extends from the end of the housing to which the gas stream is delivered, said passageway being in flow communication with the gas delivery means;
a relatively thick, packed bed, initial catalyst chamber disposed within the tubular passageway so that the gas stream flows generally axially through the chamber as it flows through the passageway;
A generally annular final catalyst chamber within the housing which surrounds the initial catalyst chamber and the tubular passageway and is spaced apart from the tubular passageway to form a channel between it and the tubular passageway and which has a long, relatively thin, packed bed extending over a significantly greater axial length than the initial catalyst chamber;
a means within the housing, in flow communication with the tubular passageway, for delivering the partially recombined gas stream to the long outer side of the final catalyst chamber so that the gas stream will flow radially inward through the thin packed bed of the final catalyst chamber, into the channel;
and, outlet means, in flow communication with the channel, for removing the gas stream from the channel and the apparatus.

* * * * *

UNITED STATES PATENT AND TRADEMARK OFFICE
CERTIFICATE OF CORRECTION

PATENT NO. : 4,008,050
DATED : February 15, 1977
INVENTOR(S) : Erwin C. Betz

It is certified that error appears in the above-identified patent and that said Letters Patent are hereby corrected as shown below:

Column 4, line 43, "by" should be - - be - -.

Claim 1, line 5, "contained" should be - - containing - -.

Claim 9, line 7, "whch" should be - - which - -.

Claim 10, line 15, "A" should be - - a - -.

Signed and Sealed this

Twenty-eighth Day of June 1977

[SEAL]

Attest:

RUTH C. MASON
*Attesting Officer*

C. MARSHALL DANN
*Commissioner of Patents and Trademarks*